United States Patent
Gresset et al.

(10) Patent No.: US 9,025,642 B2
(45) Date of Patent: May 5, 2015

(54) METHOD AND A DEVICE FOR RELAYING SYMBOLS TRANSFERRED BY A SOURCE TO A DESTINATION

(75) Inventors: Nicolas Gresset, Rennes Cedex (FR); Melanie Plainchault, Rennes Cedex (FR); Ghaya Rekaya-Ben Othman, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 676 days.

(21) Appl. No.: 12/856,109

(22) Filed: Aug. 13, 2010

(65) Prior Publication Data

US 2011/0051821 A1 Mar. 3, 2011

(30) Foreign Application Priority Data

Sep. 3, 2009 (EP) ..................................... 09169411

(51) Int. Cl.
  *H04B 3/36* (2006.01)
  *H04B 7/17* (2006.01)
  *H04B 17/02* (2006.01)
  *H04L 25/20* (2006.01)
  *H04L 25/52* (2006.01)
  *H04B 7/155* (2006.01)

(52) U.S. Cl.
  CPC ............ *H04B 7/15592* (2013.01); *H04L 25/20* (2013.01)

(58) Field of Classification Search
  None
  See application file for complete search history.

(56) References Cited

U.S. PATENT DOCUMENTS

| | | | |
|---|---|---|---|
| 2006/0133533 A1* | 6/2006 | Khandekar et al. | 375/279 |
| 2007/0086512 A1 | 4/2007 | Can et al. | |
| 2007/0190933 A1* | 8/2007 | Zheng et al. | 455/7 |
| 2007/0197161 A1* | 8/2007 | Walke et al. | 455/7 |
| 2007/0223374 A1 | 9/2007 | Popvski et al. | |
| 2008/0045212 A1* | 2/2008 | Kim et al. | 455/435.1 |
| 2008/0075178 A1* | 3/2008 | Lappetelainen et al. | 375/260 |
| 2009/0116422 A1 | 5/2009 | Chong et al. | |

FOREIGN PATENT DOCUMENTS

WO  WO 2009/069870  6/2009

OTHER PUBLICATIONS

U.S. Appl. No. 12/850,976, filed Aug. 5, 2010, Gresset, et al.
"TDMA H-ARQ Code for Layer-2 Relay in LTE-Advanced", Alcatel-Lucent, 3GPP TSG RAN WG1 Meeting #55, Nov. 10-14, 2008, XP050317432, 5 pages.

(Continued)

Primary Examiner — Shuwang Liu
Assistant Examiner — Gina McKie
(74) Attorney, Agent, or Firm — Oblon, McClelland, Maier & Neustadt, L.L.P.

(57) ABSTRACT

The present invention concerns a method for relaying symbols transferred by a source to a destination in a wireless cellular telecommunication network, the symbols being relayed by a relay, the relay receiving symbols, the symbols being representative of coded bits derived from information bits. The relay:
  receives symbols,
  successfully decodes the information bits from the symbols,
  determines a spectral efficiency to be used for transferring symbols from the number of coded bits transferred by the source prior the successful decoding of information bits,
  transfers symbols using a modulation that corresponds to the determined spectral efficiency.

13 Claims, 6 Drawing Sheets

(56) References Cited

OTHER PUBLICATIONS

Marteza Mardani et al., "Cross-Layer Link Adaptation Design for Relay Channels with Cooperative ARQ Protocol", IEEE 10th Workshop on Signal Processing Advances in Wireless Communications, IEEE, Jun. 21, 2009, XP031487878, 5 pages.

Joachim Hagenauer, "Rate-Compatible Punctured Convolutional Codes (RCPC Codes) and their Applications", IEEE Transactions on Communications, vol. 36, No. 4, Apr. 1988, XP000670428, 12 pages.

Stefan Valentin et al., "Cooperative Wireless Networking Beyond Store-and-Forward", Wireless Personal Communications, vol. 48, No. 1, Nov. 30, 2007, XP019650469, 20 pages.

Mahmood Mohassel Feghhi et al., "Spectrally Efficient Cooperative Coded Schemes for Next Generation Wireless Networks", Canadian Conference on Electrical and Computer Engineering, IEEE, 2009, XP031477306, 5 pages.

"Operation of Relay Nodes for LTE-Advanced", Icera Semiconductor, 3GPP TSG RAN WG1 Meeting #55bis, Jan. 12-16, 2009, XP050318293, 4 pages.

Younsun Kim et al., "Infrastructure Relay Transmission With Cooperative MIMO", IEEE Transactions on Vehicular Technology, vol. 57, No. 4, Jul. 2008, XP011224335, 9 pages.

Nam H. Vien et al., "Diversity Analysis of Smart Relaying", IEEE Globecom Proceedings, 2008, XP031370605, 5 pages.

* cited by examiner

METHOD AND A DEVICE FOR RELAYING SYMBOLS TRANSFERRED BY A SOURCE TO A DESTINATION

BACKGROUND

The present invention relates generally to a method and a device for relaying symbols transferred by a source to a destination in a wireless cellular telecommunication network.

Future wireless cellular telecommunication networks will use higher frequency bands than the ones used by current wireless cellular telecommunication networks.

New wireless cellular telecommunication networks, particularly in urban environment, will have dead zones, wherein the signals transferred between base stations and terminals will be highly attenuated.

SUMMARY

The present invention aims at enhancing the signals received by the destination by using a relay.

Furthermore, the present invention aims at increasing the diversity of symbols transferred to the destination.

To that end, the present invention concerns a method for relaying symbols transferred by a source to a destination in a wireless cellular telecommunication network, the symbols being relayed by a relay, the relay receiving symbols, the symbols being representative of coded bits derived from information bits, characterised in that the method comprises the steps executed by the relay of:
  receiving symbols,
  successfully decoding the information bits from the symbols,
  determining a spectral efficiency to be used for transferring symbols, from the number of coded bits transferred by the source prior the successful decoding of the information bits,
  transferring symbols using a modulation that corresponds to the determined spectral efficiency.

The present invention concerns also a device for relaying symbols transferred by a source to a destination in a wireless cellular telecommunication network, the symbols being relayed by a relay, the relay receiving symbols, the symbols being representative of coded bits derived from information bits, characterised in that the device for relaying symbols is included in the relay and comprises:
  means for receiving symbols,
  means for successfully decoding the information bits from the symbols,
  means for determining a spectral efficiency to be used for transferring symbols, from the number of coded bits transferred by the source prior the successful decoding of the information bits from the symbols,
  means for transferring symbols using a modulation that corresponds to the determined spectral efficiency.

Thus, the relay adapts its transmission dynamically and when it can correctly decode the information bits. The relay only transmits signals that can help the destination to retrieve information bits. The use of the relay is efficient and does not generate too much interference on neighbouring communications.

According to a particular feature, the spectral efficiency is further determined from the spectral efficiency used for transferring symbols by the source prior the successful decoding of the information bits from the symbols.

Thus, the relay can choose the spectral efficiency that gives the best performance improvement at the destination.

According to a particular feature, the spectral efficiency is further determined from the number of information bits.

Thus, the relay can choose the spectral efficiency that gives the best performance improvement at the destination.

According to a particular feature, the spectral efficiency is further determined from the maximum number of time slots to be used by the source for transferring symbols representative of the coded bits derived from the information bits.

Thus, the relay can choose the spectral efficiency that gives the best performance and diversity improvement at the destination.

According to a particular feature, the spectral efficiency is determined according to the following formula:

$$m_R \geq m_{min}(L1) = \left\lceil \frac{K}{T_M - N_{L1}/m_1} \right\rceil,$$

where $m_{min}(L1)$ is the minimum spectral efficiency which guaranties a full diversity, L1 is the time period during which the relay did not successfully decode information bits, $T_M$ is the maximum number of time slots to be used by the source for transferring symbols representative of the coded bits derived from the information bits, $N_{L1}$ is the number of coded bits transferred during L1, $m_1$ is the spectral efficiency of modulation used by the source Src for transferring symbols during L1 and $\lceil x \rceil$ denotes the smallest integer larger than x.

Thus, the relay can choose the spectral efficiency that gives the best performance and diversity improvement at the destination.

According to a particular feature, a message is transferred by the relay to the source notifying that the information bits have been successfully decoded.

Thus, the source can adapt its transmission with the knowledge that the relay will be activated.

According to a particular feature, the source interrupts the transmission of symbols as soon as the source receives the message notifying that the information bits have been successfully decoded.

Thus, the destination receives either from the source or from the relay and does not need a particular modification of its receiver.

According to a particular feature, the source transfers symbols at the same time as the relay transfers symbols.

Thus, the relay transmit additional signal superimposed with the signal of the source, that helps the destination for having a better reception performance.

According to a particular feature, the symbols transferred by the source at the same time as the relay transfers symbols are different one from each other.

Thus, it is not needed to inform the source of the presence of the relay, which allows for a transparent deployment of relays, from the source point of view.

According to a particular feature, the symbols sent by the relay are derived from the ones sent at the same time by the source.

Thus, it is possible to use a distributed space-time code to give a structure to the superimposed signals of the source and the relay that improves the performance at the destination.

According to a particular feature, a spectral efficiency to be used by the source for transferring symbols after the successful decoding of symbols is determined.

Thus, the source transmission is adapted to the activation of the relay.

According to a particular feature, the relay:
- compares the number of coded bits transferred by the source before the successful decoding by the relay of the information bits to a value derived from the spectral efficiency used by the source for transferring symbols before the successful decoding of the information bits, the number of information bits and the maximum number of time slots to be used by the source for transferring symbols representative of the coded bits and derived from the information bits.
- selects a transmission scheme according to the result of the comparison.

Thus, the destination takes the best benefit from the activation of the relay, as a function of its activation time.

According to a particular feature, the value derived from the spectral efficiency used for transferring symbols by the source before the successful decoding of information bits, the number of information bits and the maximum number of time slots to be used by the source for transferring symbols representative of the coded bits derived from the information bits is equal to:

$$N_{L1} \leq m_1 \cdot T_M - K$$

where $m_1$ is the spectral efficiency used for transferring symbols by the source before the successful decoding of information bits, K is the number of information bits and $T_M$ is the maximum number of time slots to be used by the source for transferring symbols representative of the coded bits derived from the information bits.

Thus, the destination takes the best benefit from the activation of the relay, as a function of its activation time.

According to a particular feature, if the number of coded bits transferred by the source before the successful decoding of the information bits is strictly upper than the value, the selected transmission scheme is a distributed Spatial Division Multiplexing transmission scheme and the spectral efficiency is determined according to the following formula:

$$m_R \geq m_{min}(L1) = \left\lceil \frac{K}{T_M - N_{L1}/m_1} \right\rceil,$$

otherwise the selected transmission scheme is a distributed Space-Time Block Coding transmission scheme and the spectral efficiency is the spectral efficiency of modulation used by the source Src for transferring symbols during L1.

BRIEF DESCRIPTION OF THE DRAWINGS

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and device according to the invention, they will not be repeated here.

Figure 1:
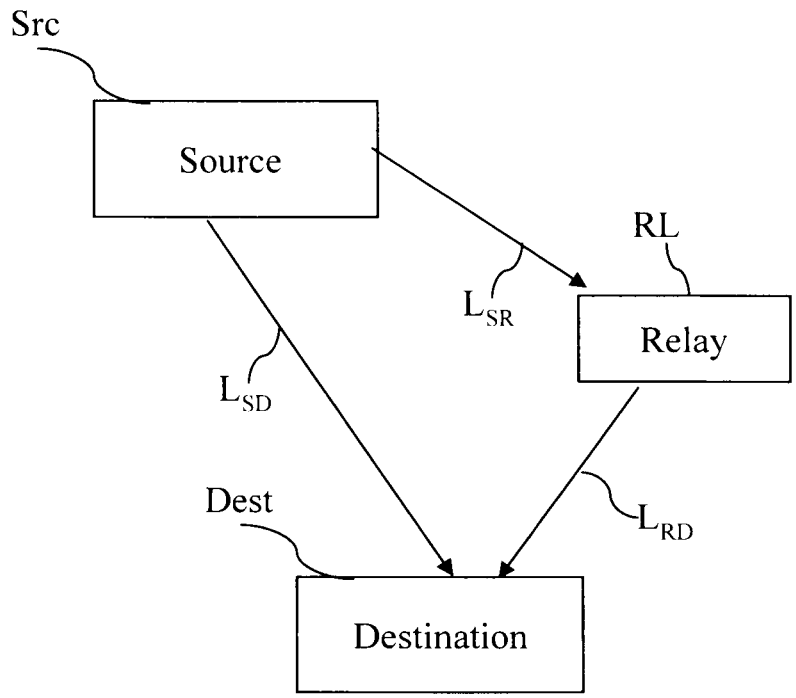
Figure 2:
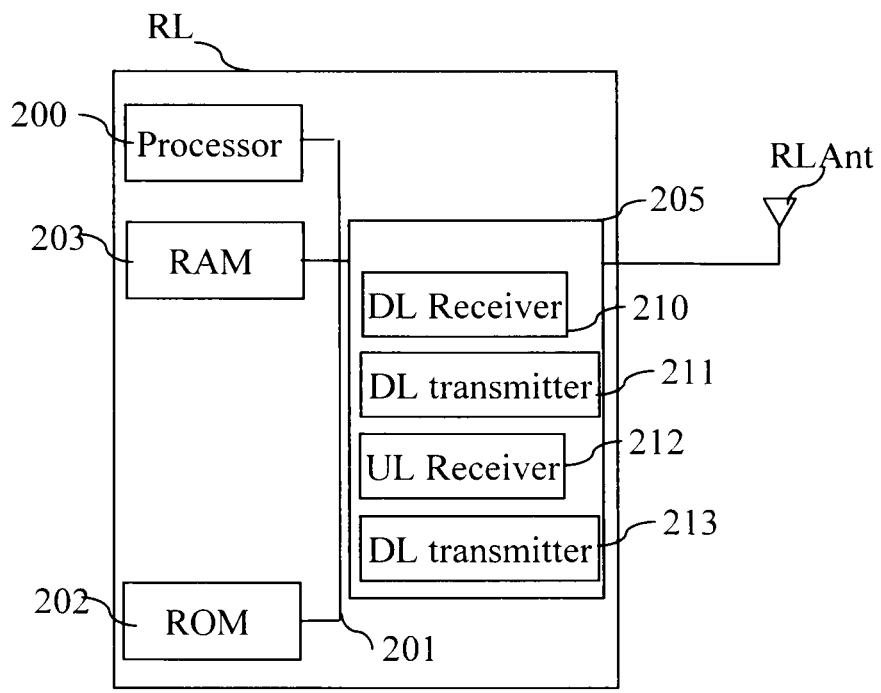
Figure 3:
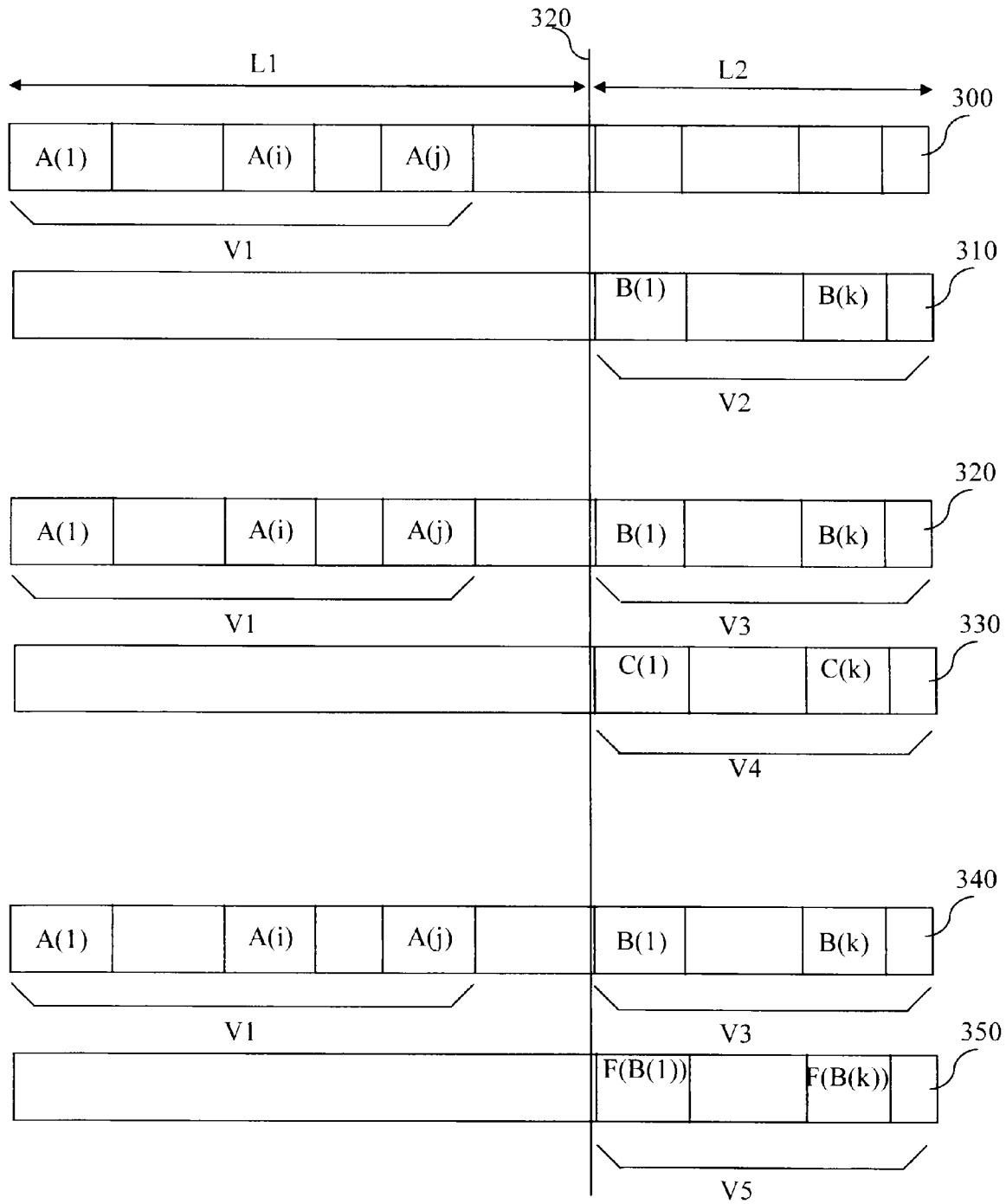
Figure 4:
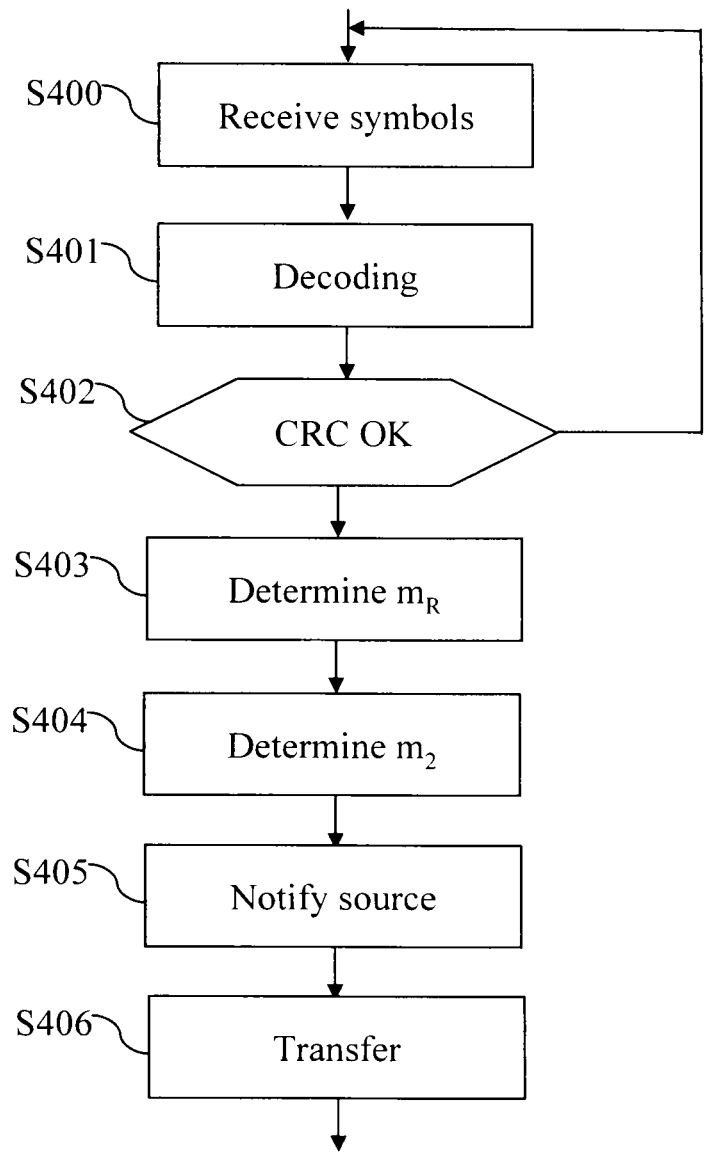
Figure 5:
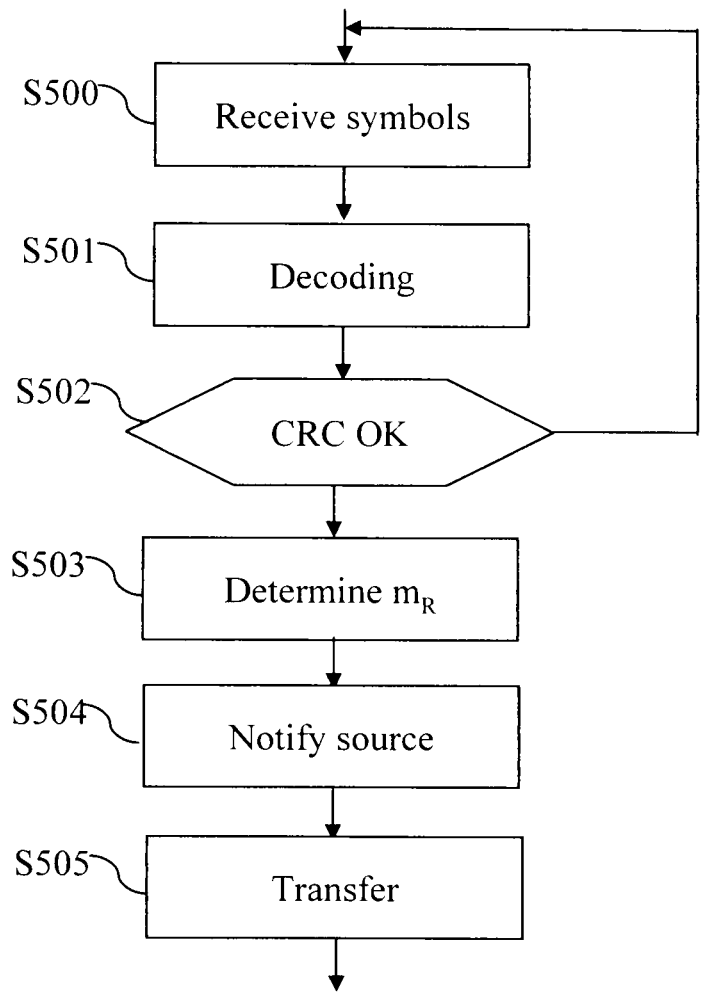
Figure 6:
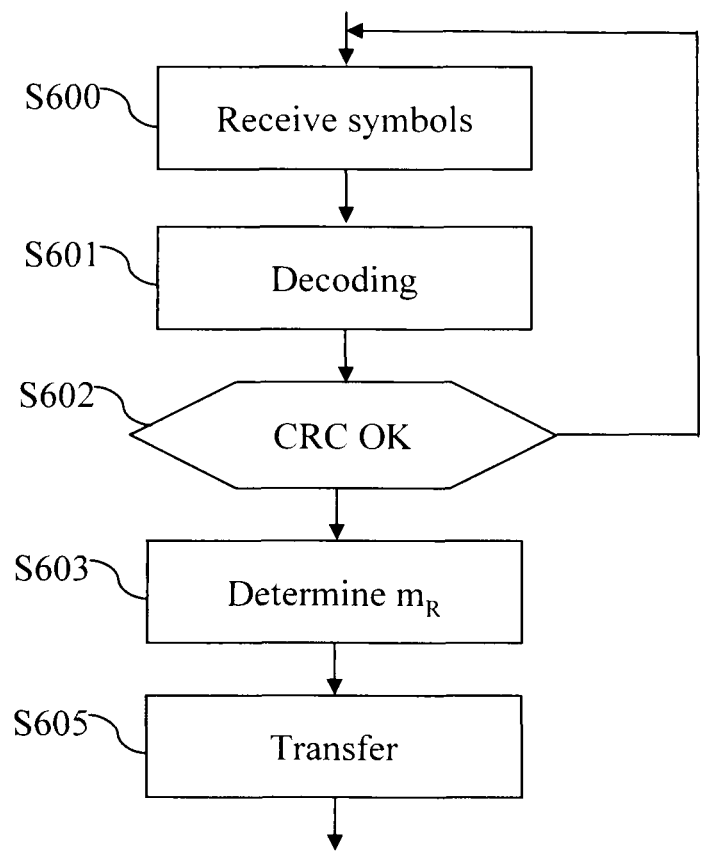
Figure 7:
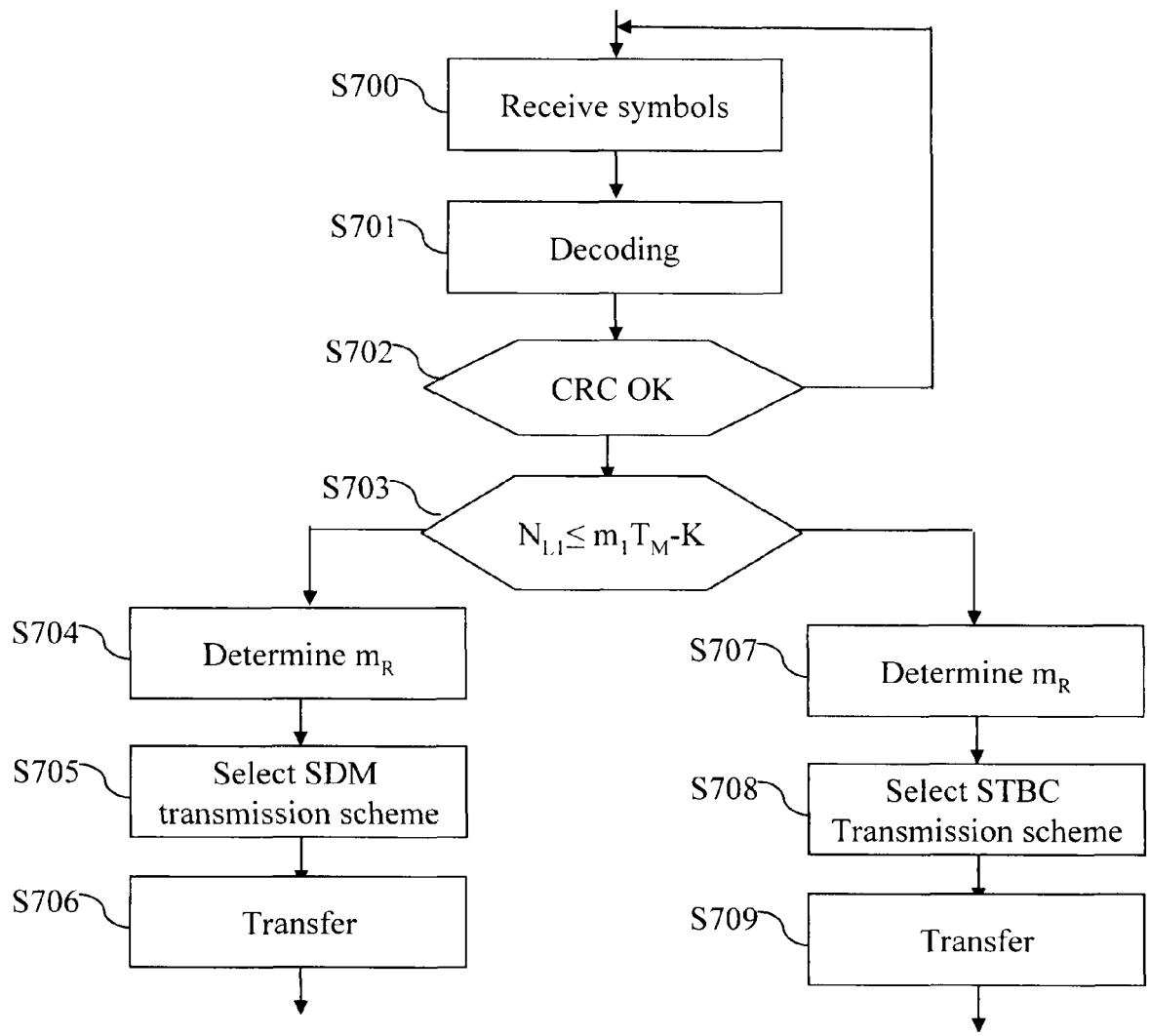

The characteristics of the invention will emerge more clearly from a reading of the following description of an example embodiment, the said description being produced with reference to the accompanying drawings, among which:

FIG. 1 represents the architecture of a wireless cellular telecommunication network in which the present invention is implemented;

FIG. 2 is a diagram representing the architecture of a relay in which the present invention is implemented;

FIG. 3 shows examples of different transmission schemes used by the present invention;

FIG. 4 discloses an example of an algorithm executed by the relay according to a first mode of realisation of the present invention;

FIG. 5 discloses an example of an algorithm executed by the relay according to a second mode of realisation of the present invention;

FIG. 6 discloses an example of an algorithm executed by the relay according to a third mode of realisation of the present invention;

FIG. 7 discloses an example of an algorithm executed by the relay according to a fourth mode of realisation of the present invention;

DETAILED DESCRIPTION

FIG. 1 represents the architecture of a wireless cellular telecommunication network in which the present invention is implemented.

In the wireless cellular telecommunication network, a source Src transfers signals to at least one destination Dest.

The source Src may be a base station which transfers signals to at least one destination like a mobile terminal or to a home base station.

The source Src may be a mobile terminal or a home base station which transfers signals to at least one destination like a base station.

The base station is also named an access node or a node B or an enhanced node B.

The base station or the home base station may handle at least one mobile terminal.

A base station handles a mobile terminal when the base station has the information necessary for enabling the mobile terminal to establish a communication with a remote device through the base station.

The base station transfers signals to the mobile terminal through a downlink channel and receives signals transferred by the mobile terminal through an uplink channel.

The source Src transmits K information bits of an information word. Information bits are converted into coded bits by the mean of an encoder followed by an interleaver in order to form a vector of coded bits.

The vector of coded bits is given to the discrete modulation input which may be a Quadrature Phase Shift Keying modulation or a 16, 32 or 64 Quadrature Amplitude Modulation in order to obtain complex modulation symbols.

The complex modulation symbols are grouped into vectors of complex modulation symbols which encompass several blocks of complex modulation symbols.

Each block of complex modulation symbols is sent over several time periods through the channel by means of virtual antennas which are composed of the concatenation of a precoding scheme that applies a transformation of the complex modulation symbols before mapping to the physical transmit antennas.

The minimum number of complex symbols comprised in a block of complex symbols is equal to the number of virtual antennas of the antenna array formed by the relay RL and the source Src.

The encoding and interleaving is done more generally by a rate matching algorithm, such as the one used in the 3GPP- LTE standard (Third Generation Partnership Project-Long Term Evolution), that allows to generate any size of vector of coded bits from the information bits, or in other words any possible coding rate. The generation of the coded bits can also be done in several steps, according to the blocks of complex modulation symbols transmission.

In the wireless cellular telecommunication network, a Hybrid-ARQ (HARQ) feedback scheme is provided from the destination Dest to the source Src in order to acknowledge or not the success of former blocks transmissions.

In Hybrid-ARQ, a retransmission of additional redundancy is executed when the destination Dest is not able to successfully decode symbols, i.e. when the Cyclic redundancy Check embedded in the sent information word (CRC) fails.

As soon as sufficient coded bits are sent, the destination Dest can decode the message correctly and the transmission is stopped.

The destination Dest stores the concatenation of vectors of complex modulation symbols or of soft estimates of the coded bits received from the beginning of one information word transmission and applies a joint decoding on the concatenated vectors.

An acknowledgment is performed after a vector of complex modulation symbols reception and decoding if the CRC check for the vector of complex modulation symbols is correct.

Usually, each new vector of complex modulation symbols comprises additional redundancy bits taken from the output of the rate matching algorithm and of the error correcting code.

It has to be noted here that the present invention is also applicable in open-loop transmissions like broadcasting where a codeword is segmented into several vectors of coded bits or equivalently to several vectors of complex modulation symbols.

The arrow noted $L_{SR}$ represents the path between the source Src and the relay RL. The arrow noted $L_{RD}$ represents the path between the relay RL and the destination Dest. The arrow noted $L_{SD}$ represents the path between the source Src and the destination Dest.

According to the invention, when the relay RL receives and successfully decodes information bits from the symbols, the relay RL determines a spectral efficiency to be used for transferring symbols, from the number of coded bits transferred by the source prior the successful decoding of the information bits. The relay RL transfers symbols using a modulation that corresponds to the determined spectral efficiency.

The relay RL operates according to a Dynamic Decode and Forward (DDF) protocol.

DDF protocol includes a smart processing at the relay RL. The relay RL receives and tries to decode the information transmitted from the source Src to the destination Dest and shifts to a transmission phase as soon as the decoding leads to no error.

In a particular mode of realisation of the present invention, the relay RL monitors the acknowledgments and non acknowledgments transferred by the destination Dest to the source Src.

When the relay RL receives and successfully decodes information bits, the relay RL generates symbols only when a non acknowledgment is detected. When an acknowledgment is detected, no more symbol is generated by the source Src and the relay RL for the message transmission.

FIG. 2 is a diagram representing the architecture of a relay in which the present invention is implemented.

The relay RL has, for example, an architecture based on components connected together by a bus 201 and a processor 200 controlled by the programs as disclosed in the FIGS. 4 to 7.

The bus 201 links the processor 200 to a read only memory ROM 202, a random access memory RAM 203 and a wireless interface 205.

The memory 203 contains registers intended to receive variables and the instructions of the programs as disclosed in the FIGS. 4 to 7.

The processor 200 controls the operation of the wireless interface 205.

The read only memory 202 contains instructions of the programs as disclosed in the FIGS. 4 to 7, which are transferred, when the relay RL is powered on, to the random access memory 203.

The wireless interface 205 enables the relay RL to transfer and/or receive signals or messages to/from a base station or a home base station and to/from at least one mobile terminal.

The wireless interface 205 may comprise a downlink reception module 210 which receives signals transferred by at least one base station or by a home base station, may comprise a downlink transmission module 211 which transfers signals to at least one mobile terminal or to a home base station, may comprise an uplink reception module 212 which receives signals transferred by at least one mobile terminal or by a home base station and may comprise an uplink transmission module 213 which transfers signals to at least one base station or to a home base station.

FIG. 3 shows examples of different transmission schemes used by the present invention.

Parts noted 300 and 310 correspond to an Orthogonal DDF transmission scheme (ODDF).

In ODDF protocol, the source SRC transfers symbols, the relay RL receives and tries to decode in the phase noted L1 in FIG. 3, the symbols transmitted by the source Src to the destination Dest. Once the relay RL successfully decodes symbols, instant represented by the line noted 320 in FIG. 3, the relay RL informs the source Src of the successful decoding and shifts to a transmission phase noted L2 in FIG. 3.

During the phase L2, the source Src interrupts the transmission of symbols.

In the example of FIG. 3, the source Src transfers during phase L1, a vector of complex modulation symbols V1 and the relay transfers the vector of complex modulation symbols V2 during phase L2.

The vector of complex modulation symbols V1 comprises the blocks of complex symbols A(1), A(i) and A(j). The vector of complex modulation symbols V1 is received and successfully decoded by the relay RL but unsuccessfully decoded by the destination Dest.

The vector of complex modulation symbols V2 comprises the blocks of complex symbols B(1) and B(k).

Only one vector of complex modulation symbols V1 is transferred by the source Src in phase L1 and only one vector of complex modulation symbols V2 is transferred by the relay RL in FIG. 3 for the sake of clarity but a more important number of vectors of complex modulation symbols are transferred in phases L1 and L2.

Parts noted 320 and 330 correspond to a distributed Spatial Division Multiplexing (SDM) transmission scheme.

In distributed SDM protocols, the source Src transfers symbols, the relay RL receives and tries to decode in the phase L1, the symbols transmitted by the source Src to the destination Dest.

Once the relay RL successfully decodes symbols at line 320, the relay RL may inform or not the source Src of the successful decoding and shifts to a transmission phase L2.

During the phase L2, the source Src continues the transmission of symbols which are different from the symbols transferred by the relay RL.

In the example of FIG. 3, the source Src transfers during phase L1, the vector of complex modulation symbols V1 already disclosed.

The source Src transfers during phase L2, the vector of complex modulation symbols V3 and the relay RL transfers the vector of complex modulation symbols V4 during phase L2.

The vector of complex modulation symbols V3 comprises the blocks of complex symbols B(1) and B(k).

The vector of complex modulation symbols V4 comprises the blocks of complex symbols C(1) and C(k).

Only one vector of complex modulation symbols V1 is transferred by the source Src in phase L1, only one vector of complex modulation symbols V3 is transferred by the source Src in phase L2 and only one vector of complex modulation symbols V4 is transferred by the relay RL in FIG. 3 for the sake of clarity but a more important number of vectors of complex modulation symbols are transferred in phases L1 and L2.

Parts noted 340 and 350 correspond to a distributed Space-Time Block Coding (STBC) transmission scheme.

In the distributed STBC transmission scheme, the source Src transfers symbols. The relay RL receives and tries to decode in the phase L1, the symbols transmitted by the source Src to the destination Dest.

Once the relay RL successfully decodes symbols at 320, the relay RL may inform or not the source Src of the successful decoding and shifts to a transmission phase L2.

During the phase L2, the source Src continues the transmission of symbols and the relay RL transfers a modified version of the symbols transferred by the source Src at the same time.

For example, in order to get a modified version of the symbols transferred by the source Src, one can use an Alamouti scheme as disclosed in the paper of S. M. Alamouti entitled "A simple transmit diversity technique for wireless communications" published in IEEE J. Sel. Areas Commun., 16:1451-1458, 1998) that spreads two symbols on two antennas i.e. the antenna of the source Src and the antenna of the relay RL and two time slots, or a full-rate space time code such as the golden code as disclosed in the paper of J.-C. Belfiore, G. Rekaya, E. Viterbo and entitled "The Golden Code: A 2×2 Full-Rate Space-Time Code with Non-Vanishing Determinants," published in IEEE Transactions on Information Theory, vol. 51, n. 4, pp. 1432-1436, April 2005. that spreads symbols on two antennas and two time slots.

In the example of FIG. 3, the source Src transfers during phase L1, the vector of complex modulation symbols V1 already disclosed, the source Src transfers during phase L2, the vector of complex modulation symbols V3 already disclosed.

The relay RL transfers the vector of complex modulation symbols V5 during phase L2.

The vector of complex modulation symbols V5 comprises the blocks of complex symbols F(B(1)) and F(B(k)) where F(x) denotes a modified version of x.

Only one vector of complex modulation symbols V1 is transferred by the source Src in phase L1, only one vector of complex modulation symbols V3 is transferred by the source Src in phase L2 and only one vector of complex modulation symbols V5 is transferred by the relay RL in FIG. 3 for the sake of clarity but a more important number of vectors of complex modulation symbols are transferred in phases L1 and L2.

FIG. 4 discloses an example of an algorithm executed by the relay according to a first mode of realisation of the present invention.

More precisely, the present algorithm is executed by the processor 200 of the relay RL when the distributed STBC transmission scheme is used.

At step S400, the processor 200 detects the reception of a vector of complex modulation symbols through the wireless interface 205.

The vector of complex modulation symbols is received by the downlink receiver 210 or the uplink receiver 212 and is concatenated to the vectors of complex modulation symbols which have been previously received from the beginning of the transmission of one information word.

At next step S401, the processor 200 commands the wireless interface to decode at least one received vector of complex modulation symbols. The at least one received vector of complex modulation symbols includes, according to the example of FIG. 3, the vector of complex modulation symbols V1 and may include at least one vector of complex modulation symbols previously received by the relay RL and not shown in FIG. 3.

The at least one vector of complex modulation symbols is demodulated into soft-estimates of coded bits, de-interleaved and decoded into the information bits estimates.

At next step S402, the processor 200 checks if the CRC determined after the decoding of the at least one decoded received vector of complex modulation symbols is correct.

If the CRC is correct, the processor 200 moves to step S403, otherwise, the processor 200 returns to step S400.

It has to be noted here that in a variant, if the CRC is correct, the processor 200 moves to step S403 and the processor 200 further checks if an acknowledgment message has been transferred by the destination Dest to the source Src for the last received vector of complex modulation symbols.

If an acknowledgment message has been transferred, the processor 200 returns to step S400, otherwise, the processor 200 moves to step S403.

Once the CRC is correct, i.e. starting from the line noted 320 in FIG. 3, the processor 200 knows the K information bits transmitted by the source Src and is able to generate blocks and vectors of complex modulation symbols in the same way as the source Src, thanks to the rate matching algorithm.

At step S403, the processor 200 determines a spectral efficiency $m_r$ of modulation to be used by the relay RL for transferring symbols during phase L2.

Inventors have found that the full diversity order can be observed after receiving the maximal length codeword, corresponding to the maximal number of time slots allowed for the transmission of one information word composed of information bits without relay, only if the number of coded bits $N_{LR}$ transferred by the relay RL during phase L2 is equal to or upper than the number K of information bits transferred by the source Src.

That condition can be formulated as:

$$m_R \geq m_{min}(L1) = \left\lceil \frac{K}{T_M - N_{L1}/m_1} \right\rceil,$$

where $m_{min}(L1)$ is the minimum spectral efficiency which guaranties the full diversity, $T_M$ is the maximum number of time slots for transmission allowed to the maximal codeword length for a transmission without relay, $N_{L1}$ is the number of coded bits transferred during phase L1, $m_1$ is the spectral efficiency of modulation used by the source Src for transferring symbols during phase L1 and $\lceil x \rceil$ denotes the smallest integer larger than x.

The spectral efficiency $m_r$ varies as a function of the duration of phase L1.

For example, the possible spectral efficiency $m_r$ may typically be equal to two for a QPSK modulation, four for a 16-QAM modulation and 6 for a 64-QAM modulation.

If $m_{min}(L1)$ is larger than the highest spectral efficiency of the modulation supported by the system, the full diversity order cannot be observed after receiving the maximal length codeword.

It has to be noted here that in a variant, if $m_1$ is equal to or lower than the spectral efficiency $m_r$, $m_r$ is set as to be equal to $m_1$. If $m_1$ is higher than the spectral efficiency $m_r$, the processor 200 returns to step S400 of the present algorithm.

At next step S404, the processor 200 determines a spectral efficiency $m_2$ of modulation to be used by the source Src for transferring symbols during phase L2.

The spectral efficiency $m_2$ is for example set as to be equal to $m_r$.

At next step S405, the processor 200 commands the transfer of a message to the source Src. The message comprises information representative of the determined spectral efficiency $m_2$ and the determined modulation scheme.

At next step S406, the processor 200 commands the transfer of the vector of complex modulation symbols V5 using the modulation scheme which corresponds to the determined possible spectral efficiency $m_r$.

FIG. 5 discloses an example of an algorithm executed by the relay according to a second mode of realisation of the present invention.

More precisely, the present algorithm is executed by the processor 200 of the relay RL when the Orthogonal DDF transmission scheme is used.

The steps S500 to S503 are respectively identical to the steps S400 to S403 of FIG. 4. They will not be described anymore.

At next step S504, the processor 200 commands the transfer of a message to the source Src. The message comprises information representative of the start of transmission of symbols by the relay RL.

Once the source Src receives the message, the source Src interrupts the transfer of vector of complex modulation symbols.

At next step S505, the processor 200 commands the transfer of the vector of complex modulation symbols V2 using the modulation scheme which corresponds to the determined possible spectral efficiency $m_r$.

FIG. 6 discloses an example of an algorithm executed by the relay according to a third mode of realisation of the present invention.

More precisely, the present algorithm is executed by the processor 200 of the relay RL when the distributed SDM transmission scheme is used.

The steps S600 to S603 are respectively identical to the steps S400 to S403 of FIG. 4. They will not be described anymore.

At step S604, the processor 200 commands the transfer of the vector of complex modulation symbols V4 using the modulation scheme which corresponds to the determined possible spectral efficiency $m_r$.

FIG. 7 discloses an example of an algorithm executed by the relay according to a fourth mode of realisation of the present invention.

More precisely, the present algorithm is executed by the processor 200 of the relay RL when there is no message transferred between the source Src and relay RL.

The steps S700 to S702 are respectively identical to the steps S400 to S402 of FIG. 4. They will not be described anymore.

If the CRC determined after the decoding of the at least one decoded received vector of complex modulation symbols is correct, the processor 200 moves from step S702 to step S703.

At step S703, the processor 200 checks if the number of coded bits transferred in the phase L1 satisfies the following equation:

$$N_{L1} \leq m_1 \cdot T_M - K.$$

If $N_{L1} \leq m_1 \cdot T_M - K$, the processor 200 moves to step S707. Otherwise, the processor 200 moves to step S704.

At step S704, the processor 200 determines the spectral efficiency $m_r$ of modulation to be used by the relay RL for transferring symbols during phase L2 according to the following formula:

$$m_R \geq m_{min}(L1) = \left\lceil \frac{K}{T_M - N_{L1}/m_1} \right\rceil.$$

At next step S705, the processor 200 selects the distributed SDM transmission scheme and selects a modulation scheme which corresponds to the determined possible spectral efficiency $m_r$.

At next step S706, the processor 200 commands the transfer of the vector of complex modulation symbols using the determined modulation scheme.

At step S707, the processor 200 determines the spectral efficiency. The processor 200 chooses the spectral efficiency $m_r$ to be used by the relay RL as to be equal to $m_1$.

At next step S708, the processor 200 selects the distributed STBC transmission scheme and a modulation scheme which corresponds to the determined possible spectral efficiency $m_r$.

At next step S709, the processor 200 commands the transfer of the vector of complex modulation symbols using the determined modulation scheme.

Naturally, many modifications can be made to the embodiments of the invention described above without departing from the scope of the present invention.

The invention claimed is:

1. A method for relaying symbols transferred by a source to a destination in a wireless cellular telecommunication network, the symbols being relayed by a relay, the relay receiving symbols, the symbols being representative of coded bits derived from information bits, the method comprising:
   receiving, at the relay, coded bits corresponding to the symbols transmitted from the source to the destination;
   successfully decoding, at the relay, the coded bits into information bits corresponding to the symbols;
   determining, at the relay, a spectral efficiency to be used to transmit the symbols from the relay to the destination based on a number of coded bits received from the source prior to the successful decoding of the information bits;
   determining, at the relay, whether an acknowledgement message acknowledging receipt at the destination of the symbols transmitted by the source via a direct communication path between the source and the destination is received from the destination; and
   transferring, from the relay to the destination, the symbols using a modulation that corresponds to the determined spectral efficiency only when the acknowledgement message is not received from the destination.

2. The method according to claim 1, wherein the spectral efficiency is further determined from a spectral efficiency used for transferring symbols by the source prior to the successful decoding of the information bits.

3. The method according to claim 1, wherein the spectral efficiency is further determined from the number of information bits.

4. The method according to claim 1, wherein the spectral efficiency is further determined from a maximum number of time slots to be used by the source for transferring symbols representative of the coded bits derived from the information bits.

5. The method according to claim 1, wherein the spectral efficiency is determined according to the following formula:

$$m_g \geq m_{min}(L1) = \left[\frac{K}{T_M - N_{L1}1m_1}\right];$$

where $m_{min}(L1)$ is a minimum spectral efficiency which guaranties a full diversity, L1 is a time period during which the relay did not successfully decode information bits, $T_M$ is a maximum number of time slots to be used by the source for transferring symbols representative of the coded bits derived from the information bits when the relay does not transfer symbols, $N_{L1}$ is a number of coded bits transferred during L1, $m_1$ is a spectral efficiency of modulation used by the source Src for transferring symbols during L1, K is the number of information bits and [x] denotes a smallest integer larger than x.

6. The method according to claim 1, further comprising: transferring, by the source, symbols at a same time as the relay transfers symbols.

7. The method according to claim 6, wherein the symbols transferred by the source at the same time as the relay transfers the symbols are different from the symbols transferred by the relay.

8. The method according to claim 6, wherein the symbols transferred by the relay at the same time as the source transfers symbols are derived from the symbols transferred by the source.

9. The method according to claim 8, further comprising: determining a spectral efficiency to be used by the source for transferring symbols after the successful decoding of information bits.

10. The method according to claim 1, further comprising: comparing the number of coded bits transferred by the source before the successful decoding of the information bits to a value derived from a spectral efficiency used for transferring symbols by the source before the successful decoding of information bits, the number of information bits and a maximum number of time slots to be used by the source for transferring the symbols representative of the coded bits derived from the information bits when the relay does not transfer symbols; and
selecting a transmission scheme according to a result of the comparison.

11. The method according to claim 10, wherein the value derived from the spectral efficiency used for transferring symbols by the source before the successful decoding of information bits, the number of information bits and the maximum number of time slots to be used by the source for transferring symbols representative of the coded bits derived from the information bits is equal to:

$$m_1 \cdot T_M - K$$

where $m_1$ is the spectral efficiency used for transferring symbols by the source before the successful decoding of information bits, K is the number of information bits and $T_M$ is the maximum number of time slots to be used by the source for transferring symbols representative of the coded bits derived from the information bits when the relay does not transfer symbols.

12. The method according to claim 11, wherein if the number of coded bits transferred by the source before the successful decoding of the information bits is strictly higher than the value, the selected transmission scheme is a distributed Spatial Division Multiplexing transmission scheme and the spectral efficiency is determined according to the following formula:

$$m_g \geq m_{min}(L1) = \left[\frac{K}{T_M - N_{L1}1m_1}\right]$$

where $m_{min}(L1)$ is a minimum spectral efficiency which guaranties a full diversity, L1 is a time period during which the relay did not successfully decode information bits, $T_M$ is the maximum number of time slots to be used by the source for transferring symbols representative of the coded bits derived from the information bits when the relay does not transfer symbols, $N_{L1}$ is the number of coded bits transferred during L1, $m_1$ is the spectral efficiency of modulation used by the source Src for transferring symbols during L1, K is the number of information bits and [x] denotes a smallest integer larger than x, otherwise the selected transmission scheme is a distributed Space-Time Block Coding transmission scheme and the spectral efficiency is the spectral efficiency of modulation used by the source Src for transferring symbols during L1.

13. A device for relaying symbols transferred by a source to a destination in a wireless cellular telecommunication network, the symbols being relayed by a relay, the relay receiving symbols, the symbols being representative of coded bits derived from information bits, the device for relaying symbols being included in the relay and comprising:
a processor configured to
receive coded bits corresponding to the symbols transmitted from the source to the destination,
successfully decode the coded bits into information bits corresponding to the symbols,
determine a spectral efficiency to be used to transmit the symbols from the relay to the destination based on a number of coded bits received from the source prior to the successful decoding of the information bits, determine whether an acknowledgement message acknowledging receipt at the destination of the symbols transmitted by the source via a direct communication path between the source and the destination is received from the destination, and
transfer, from the device to the destination, the symbols using a modulation that corresponds to the determined spectral efficiency only when the acknowledgement message is not received from the destination.

* * * * *